Feb. 23, 1926.

A. W. PARQUETTE 1,573,854

AUTOMATIC AIR PRESSURE SIGNAL DEVICE

Filed May 9, 1925　　2 Sheets-Sheet 1

INVENTOR=
Archibald W. Parquette
by Macleod, Calver, Copeland & Dike
Attys.

Feb. 23, 1926.

A. W. PARQUETTE 1,573,854

AUTOMATIC AIR PRESSURE SIGNAL DEVICE

Filed May 9, 1925   2 Sheets-Sheet 2

INVENTOR:
Archibald W. Parquette
by Macleod, Calver, Copeland & Dike
Attys

Patented Feb. 23, 1926.

1,573,854

UNITED STATES PATENT OFFICE.

ARCHIBALD W. PARQUETTE, OF WATERTOWN, MASSACHUSETTS.

AUTOMATIC AIR-PRESSURE SIGNAL DEVICE.

Application filed May 9, 1925. Serial No. 29,232.

*To all whom it may concern:*

Be it known that I, ARCHIBALD W. PARQUETTE, a citizen of the United States, residing at Watertown, county of Middlesex, State of Massachusetts, have invented a certain new and useful Improvement in Automatic Air-Pressure Signal Devices, of which the following is a specification, reference being had therein to the accompanying drawings.

The invention relates to a new and useful improvement in automatic signal devices for indicating when a predetermined air pressure has been reached during the process of inflating a pneumatic tire or other air inflated article.

There are various means of testing the air pressure in a tire and other air inflated articles to indicate visibly the amount of pressure therein. The usual method heretofore employed in determining whether the tire has been pumped to the desired pressure is to apply a testing device to the tire from time to time experimentally during the pumping operation and reading the pressure as indicated by the gauge. If it is not yet pumped up to the desired pressure the pumping is continued and the test is repeatedly made until the desired pressure is reached. One object of the present invention is to provide a device which can be connected up with the tire and with air pump or other source of compressed air supply, said device having a signal which will be automatically actuated by the pressure in the tire or other article when it reaches a predetermined degree so that the person controlling the admission of compressed air will know when to shut it off.

Another object is to provide means of adjustment whereby the signal will be rendered operative at any predetermined degree of pressure to which the control is set so that the particular degree of pressure required to operate the signal may be varied according to whatever degree of pressure it is desired to give the article being inflated.

Another object is to provide means for automatically shutting off the source of pressure when the pressure reaches a predetermined degree.

Other features of the invention will be particularly set forth hereinafter.

The preferred kind of signal is one which will be audible when actuated and still further the preferred audible signal is a whistle but the particular kind of signal may be any kind of an audible signal or it may even be a visible signal, the main feature being that it should be actuated by the compressed air when the pressure reaches a certain predetermined degree.

The invention will be fully understood from the following description when taken in connection with the accompanying drawings and the novel features thereof will be pointed out and clearly defined by the claims at the close of this specification.

Figure 1:
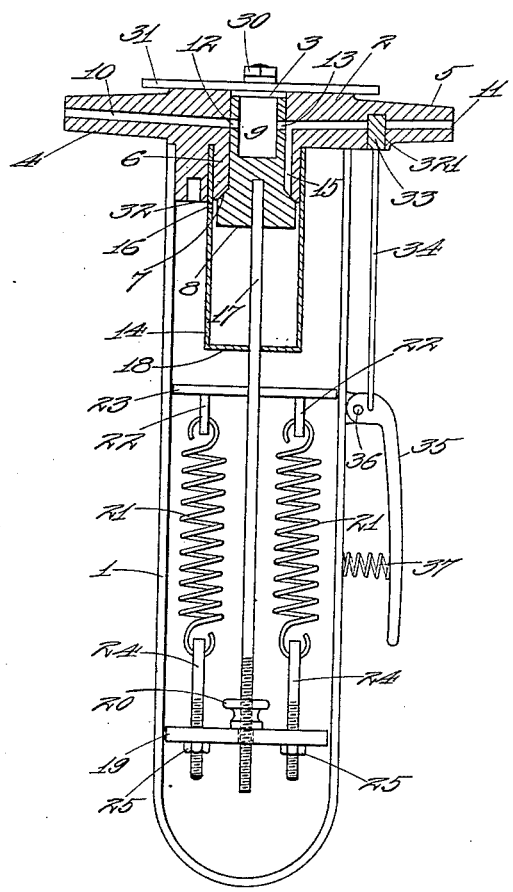
Fig. 1 is a longitudinal section of a device embodying the invention.

Referring to the drawings, there is shown at 1 a suitable casing in which the apparatus is mounted and enclosed. Connected with the casing or integral therewith is a head 2 having a chamber 3. A tubular stem 4 communicates with said chamber 3 and is adapted to be engaged with the air valve of a tire, and a tubular stem 5 communicating with said air chamber 3 is adapted to be connected with an air pump or other source of compressed air supply.

The air chamber 3 opens into a passage through a tubular boss 6 projecting from one side of the head 2, the outer end of said boss forming a seat 7 for a piston valve 8. The piston valve 8 is slidable within said tubular boss 6 and within the said air chamber 3 within which the piston has a sliding fit. The upper portion of the piston is cupped-out forming a cylindrical chamber 9. The piston extends transversely of the air passages 10, 11 which extend through the stems 4, 5 respectively and communicate with the air chamber 3 in the head 2. The wall of the cupped-out upper end portion of the piston is formed with ports 12, 13 which are in alinement with each other and with the air passages 10, 11 of the stems 4, 5 respectively when the piston valve is seated. When the piston moves down from the seated position shown in Fig. 1 far enough to bring the ports 12, 13 out of alinement with the said air passages 10, 11 the communication between the said air passages 10, 11 will be closed.

A cylinder 14 is connected with the tubular boss 6 and the piston 8 is slidable therein. The head 2 is formed with an air passage 15 communicating with the port 11 in the stem 5, said air passage 15 extending down in the wall of the boss 6 and being open at its lower end to the valve seat 7. The wall of the cylinder 14 is formed with one or more ports 16 as shown in Fig. 1. When the head of the piston valve is unseated by being moved down away from the seat 7 the said passage 15 in the valve will be open to communication with said cylinder 14 and with said ports 16. The piston valve is provided with a rod 17.

The said rod 17 passes loosely through an aperture in the lower end 18 of the cylinder, the upper end of said rod engaging with the piston 8 by a loose fit in a hole in the end of the piston.

The lower end of said piston rod extends through an aperture in a yoke 19. The connection with the yoke 19 is adjustable so that the operative length of the piston rod above the yoke may be varied. This is accomplished by making the lower part of the piston rod screw threaded and by providing an adjusting nut 20 upon the screw threaded portion of the piston rod above the yoke 19. Said nut engages the upper side of the yoke 19 to limit the upward position of the yoke. A pair of springs 21, 21 are located on opposite sides of the piston rod 17 and are secured at their upper ends to supports 22, 22 on an adjustable sliding member 23, the lower ends of said springs being connected with screw pins 24 whose threaded shanks pass loosely through guide apertures in the yoke 19 and have nuts 25 screwed upon their lower ends, said nuts engaging the underside of the yoke 19 to form seats for the yoke.

Figure 2:
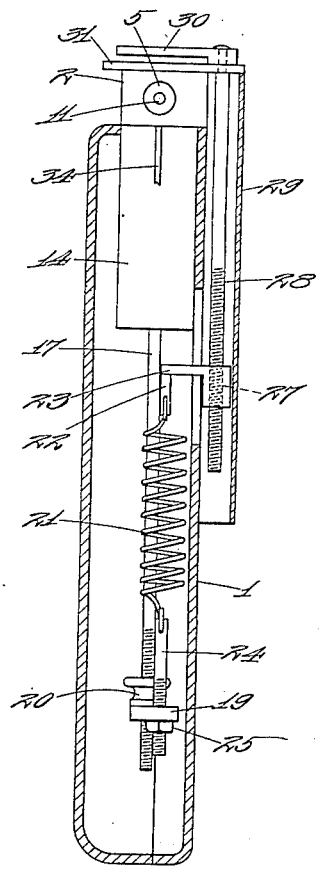
Fig. 2 is a side elevation partly broken away.
Figure 3:
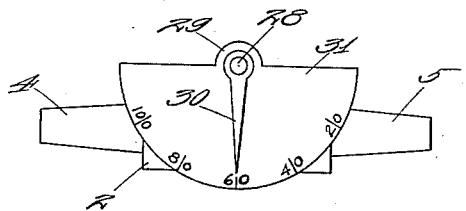
Fig. 3 is a plan view of Fig. 1.

The said springs 21 normally hold the yoke 19 in such position that it will engage the nut 20 on the piston rod with such pressure upward that the upper end of the said piston rod will maintain the valve 8 on its seat 7 so that no air can enter the cylinder 14 until the air pressure in the chamber 9 is sufficient to overcome the tension of the springs. I provide means whereby the power of the said springs may be varied so that they may be adjusted to permit them to yield under a predetermined air pressure according to whatever pressure is desired in the tire which is being inflated. The means shown are as follows: The adjustable sliding member 23 previously referred to is provided with a threaded portion 27 as shown in Fig. 2 which is engaged by a correspondingly threaded shaft 28 which passes up through bearings in a casing 29 and has mounted on its upper end a finger 30 which serves both as an index pointer and also as a finger piece to operate the worm shaft. By partially rotating the worm shaft in one direction the slide member 23 will be raised and thereby stretch the springs 21, 21 thus increasing their tension. Mounted on the outer end of the case 1 is a dial 31 graduated to different degrees to indicate the pressure desired to inflate the tire. The normal tension of the springs 21 should be so adjusted that when the pointer 30 is turned to any figure on the dial a pressure in the air chamber of the same number of pounds as indicated on the dial will be required to open the valve 8. For instance, if the index points to numeral 40 on the dial, it means that a pressure of 40 lbs. is required to open the valve, and if turned to the 50 mark on the dial, it will increase the tension of the springs so that a pressure of 50 lbs. will be required to unseat the valve. The nuts 25 on the lower ends of the screw pins 24 may be adjusted to give the suitable normal tension to the said springs to maintain the valve seated when there is no pressure in the air chamber 9. This can be determined by experiment.

Assuming that the tension of the springs has been properly adjusted and it is desired to pump up the tire to a pressure of say 40 lbs. the tubular stems 4 and 5 respectively are connected with the valve of the tire and with the air pump before the air pressure is turned on, then the index finger 30 should be turned until it points to 40 on the dial. As already stated this adjusts the tension of the springs so that an air pressure of 40 lbs. will be required in the air chamber 9 before the valve will become unseated to bring the lower end of the air passage 15 in the head 2 into communication with the outlet port 16 in the cylinder. Adjacent the outlet portion 16 there is provided a lip 32 across the edge of which the air rushes as it is expelled through the outlet port 16 thereby making a noise like a whistle and thus giving audible indication that the tire has reached the desired pressure. The form of whistle shown is merely illustrative. The whistle may be of any suitable form or location so that whenever the air pressure unseats the valve, it will be forced through the passage and sound the whistle. After the index finger has been adjusted to the required pressure as already described the communication with the air pump or source of compressed air should be opened to admit compressed air through the stem 5 to the air chamber in the head and when the air pressure has reached the predetermined degree the valve will be unseated and the whistle will be blown. Any other mechanism operated by the release of compressed air to produce an audible signal may be employed.

When the piston moves down from its seat, under the pressure as above described, the ports 12, 13 in the wall of the chambered upper portion of the piston will move out of alinement with the passages 10, 11 respectively in the stems 4, 5 and thereby cut off communication between the air chamber 9 and the tire and between the air pump and said air chamber. The piston valve will remain unseated until the pressure is reduced after which the valve will again be seated by means of the springs 21 and the air chamber 9 will again be brought into communiction with the ports 12, 13.

It is desirable to be able to close communication between the source of compressed air and the chamber 9 through the passage 11 and port 13 during the time that the valve is seated and while the passage 11 and port 13 are in alinement with each other until it is desired to force air into the tire.

The object of thus closing the communication is to enable the device to be connected up with an air pump or other source of compressed air and to be connected up with the tire before turning on the compressed air. To this end, I provide suitable means under the control of the operator for opening and closing the air passage 11 at will and while holding the instrument in his hand. Any suitable form of cut-off may be employed. The means shown in the drawings is as follows: The head 2 or the stem 5 is formed with a passage 321 which extends through the side wall of the head or stem and transversely across the passage 11. A piston valve 33 has a sliding fit in said passage 321 and is adapted to close the passage 11. The piston 33 is mounted on a rod 34 whose lower end is pivotally connected with a lever 35 fulcrumed at 36 to a projection on the case 1. A thrust spring 37 having one end connected with the lever 35 and its other end connected with the casing normally holds the lever 35 in position to maintain the valve 33 closed. When the operator is ready to open communication through the passage 11 from the source of compressed air to the chamber 9, after connections are made with the air pump and with the tire valve, he will move the free end of the lever 35 toward the casing 1, overcoming the pressure of the spring 37 and thereby pulling down the rod 34 and unseating the valve 33 thus opening the passage 11. When he desires to close the valve 33 to shut off the compressed air from the air chamber 9, he will release the lever 35 and the spring 37 will cause the valve 33 to close.

Figure 6:
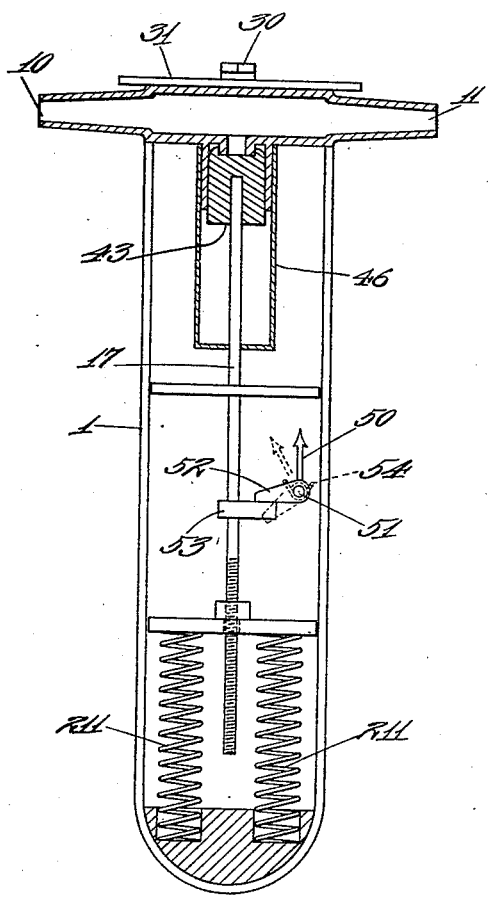
Fig. 6 is a modification showing the use of a visual signal instead of a sound signal.
Figure 4:
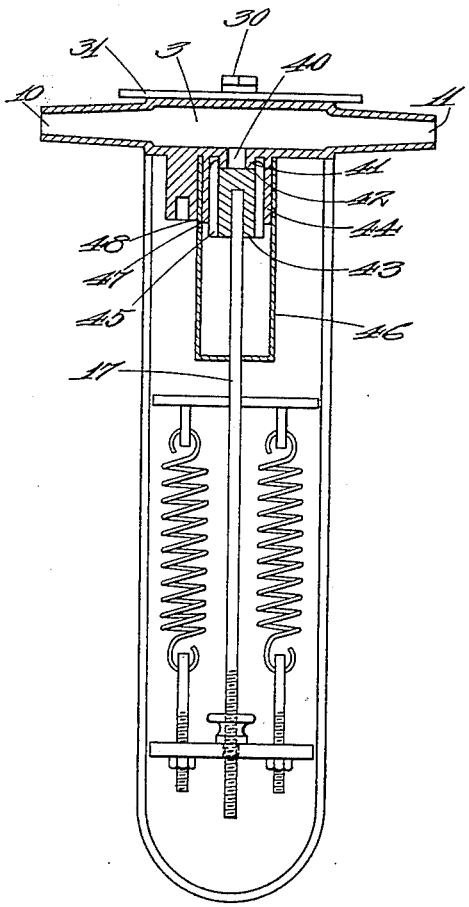
Fig. 4 shows a modified form of valve.

In the modification shown in Figs. 4 and 6 the piston valve which controls the release of compressed air from the air chamber of the head to operate the signal is shown without the automatic cut-off previously described. The head is formed with a port 40 leading from the air chamber 3 out through the side wall and through a boss 41 whose lower end forms a seat 42 for a piston valve 43 having a rod 17. In the form shown in Fig. 4 the piston valve slides in a tubular boss 44 which projects from the head and is formed with longitudinal air passages 45. A cylinder 46 fits up around the boss 44 and encloses said boss and the piston 43. The cylinder is formed with an outlet air port 47. When the piston is unseated by the air pressure, compressed air will pass down through the passages 45 and escape through the port 47, blowing across the lip 48 to produce the whistling sound.

Figure 5:
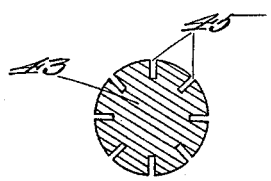
Fig. 5 is a transverse section of the piston valve through which the compressed air is forced to operate the signal when the pressure reaches a predetermined degree.

In the modification shown in Fig. 6, the piston is similar to that shown in Figs. 4 and 5. As here shown compression springs 211 are employed instead of tension springs as shown in Fig. 1. It is obvious that tension springs or compression springs may either be used. Instead of an audible signal there is here shown a visual signal which is operated by the piston rod actuated by the compressed air. Any suitable visual signal thus actuated may be employed. The means shown in the drawings are as follows:

An arrow 50 is mounted on a shaft 51 journalled in the case 1. An arm 52 is mounted fast on the shaft 51 and projects toward the piston rod 17. An arm 53 or other suitable projection from the rod 17 extends beneath the arm 52. A spring 54 mounted on shaft 51 with one end engaging the casing and the other end engaging the arm 52 tends to rotate the shaft 51 in a direction to turn the arm 52 down and turn the arrow 50 on its axis with the shaft. The arm 53 on the pivot rod 17 serves as a stop to prevent such movement as long as the valve 43 is seated. When the piston valve is unseated by the action of the compressed air and the piston rod 17 moves down, the arm 53 also moves down and permits the shaft 51 to respond to the force of the spring 54, and turn the arrow 50. This will be a visual signal to the operator that the required pressure in the tire has been reached.

It is obvious that an audible signal and a visual signal may both be employed in the same apparatus if desired. It is also obvious that an automatic cut-off piston valve such as the valve 8 shown in connection with Fig. 1 and a manually controlled valve for cutting off the compressed air through the passage 11 such as is shown and described in connection with Fig. 1 may be employed in the same apparatus as the visual signal. It is also obvious that numerous other modifications in the details of construction may be employed instead of the particular form shown in the drawings and still embody the invention consisting of the employment of an automatically operated signal actuated by the compressed air when it reaches a predetermined degree of pressure and means whereby the apparatus may be adjusted according to the predetermined amount of pressure desired before the signal will be operated.

In describing the use and operation of the device the piston and rod have been referred to as moving up and down as though the device were held in a vertical position. The terms "up" and "down" have been employed merely for convenience in description it being obvious that the instrument may be held in any convenient position desired.

What I claim is:

1. An automatic signal device having a valve body with a passage adapted to communicate at one end with a source of compressed air and at its other end with an article into which compressed air is to be introduced, said passage having an outlet port through the valve body intermediate the two ends of said passage, a piston which controls said intermediate outlet, a rod connected with said piston, a spring connected at one end with a member carried by said rod and connected at its other end with a member which is adjustable for varying the force of the spring, said spring being adapted to normally hold the piston in position to close said intermediate port until the air pressure is sufficient to overcome the resistance of the spring, a rotatable shaft having a worm portion which engages with a threaded aperture in said adjustable connecting member for the spring, the rotation of said shaft on its axis being adapted to adjust the said spring connecting member to vary the force of the spring and thereby vary the amount of air pressure required to unseat the piston.

2. A portable device for use in inflating tires and other articles comprising a casing, a valve body member having an air passage therethrough adapted to connect at one end of said air passage with a source of air pressure and connected at the other end of said passage with the article to be inflated, said body having an outlet port from said air passage intermediate the said ends, a piston valve which controls said intermediate port, a rod connected with said piston, a rotatable worm shaft having a bearing in said casing, a bracket adjustably mounted on said worm having a threaded aperture with which said worm engages whereby the rotation of the worm shaft causes the said bracket to vary its position on the shaft, a bracket mounted on said piston rod and a spring having one end connected with said piston rod bracket, the other end of said spring being connected with said worm shaft bracket whereby the variation in position of the bracket on the worm shaft will vary the tension of the spring.

3. A portable device for use in inflating tires and other articles comprising a casing, a valve body member having an air passage therethrough adapted to connect at one end of said air passage with a source of air pressure and connected at the other end of said passage with the article to be inflated, said body having an outlet port from said air passage intermediate the said ends, a piston valve which controls said intermediate port, a rod connected with said piston, a rotatable worm shaft having a bearing in said casing, a bracket adjustably mounted on said worm having a threaded aperture with which said worm engages whereby the rotation of the worm shaft causes the said bracket to vary its position on the shaft, a bracket mounted on said piston rod, a pointer carried by the worm shaft and a dial mounted on the casing graduated in such manner that as the said worm shaft is adjusted on its axis, the said pointer will indicate on the dial the tension of the spring.

4. A portable device for use in inflating tires and other articles comprising a casing, a valve body member having an air passage therethrough adapted to connect at one end of said air passage with a source of air pressure and connected at the other end of said passage with the article to be inflated, said body having an outlet port from said air passage intermediate the said ends, a piston valve which controls said intermediate port, a rod connected with said piston, a rotatable worm shaft having a bearing in said casing, a bracket adjustably mounted on said worm having a threaded aperture with which said worm engages whereby the rotation of the worm shaft causes the said bracket to vary its position on the shaft, a bracket mounted on said piston rod and a spring having one end connected with said piston rod bracket, the other end of said spring being connected with said worm shaft, said worm shaft extending through the casing, a pointer carried on the end of the worm shaft, and a dial on the valve body member graduated in such manner that as the said worm shaft is adjusted on its axis, the pointer will indicate on the dial the tension of the spring.

In testimony whereof I affix my signature.

ARCHIBALD W. PARQUETTE.